(No Model.)
C. S. DE WITT.
SPOOL FOR BARBED WIRE.
No. 338,043. Patented Mar. 16, 1886.
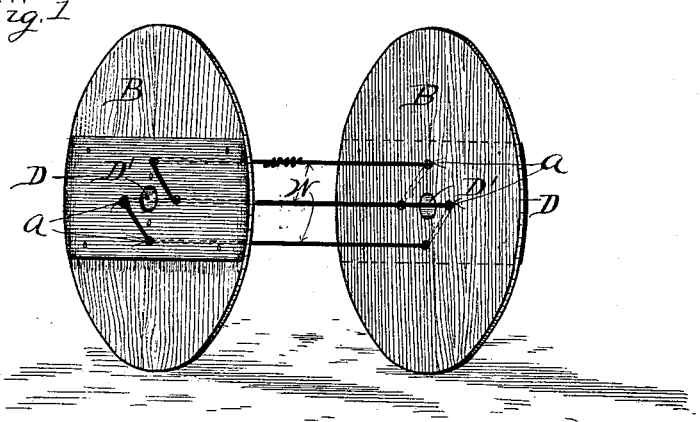
Fig. 1
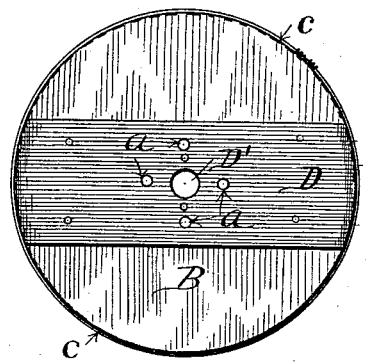
Fig. 2
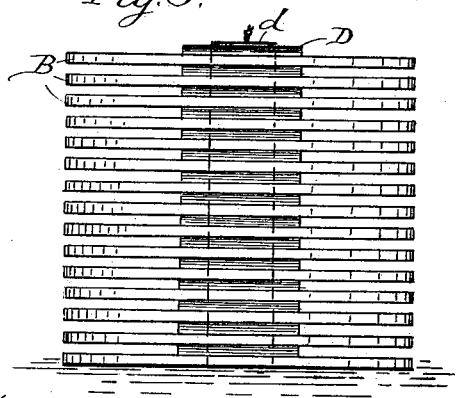
Fig. 3
Fig. 4
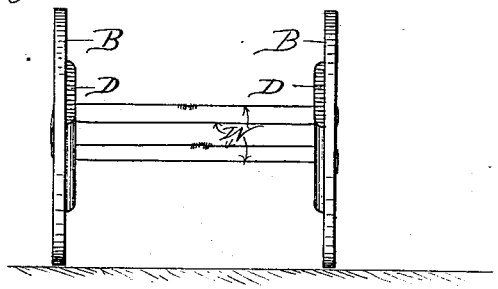
Fig. 5
Witnesses.
Thos. H. Hutchins.
Wm. J. Hutchins.
Inventor.
Caleb S. DeWitt.

UNITED STATES PATENT OFFICE.

CALEB S. DE WITT, OF LOCKPORT, ILLINOIS.

SPOOL FOR BARBED WIRE.

SPECIFICATION forming part of Letters Patent No. 338,043, dated March 16, 1886.

Application filed July 10, 1885. Serial No. 171,179. (No model.)

*To all whom it may concern:*

Be it known that I, CALEB S. DE WITT, a citizen of the United States of America, residing at Lockport, in the county of Will and State of Illinois, have invented certain new and useful Improvements in Spools for Barbed Wire, of which the following is a specification, reference being had therein to the accompanying drawings.

Figure 1 is a perspective view of the spool before the wire is wound thereon. Fig. 2 is a plan view of one of the heads of the spool. Fig. 3 is a view representing a quantity of spool-heads baled together as they would appear ready for shipment. Fig. 4 is a view of one of the spool-heads, showing a wire band around its periphery to prevent its splitting; and Fig. 5 is a side view of the spool, showing cleats on the inner sides of its ends.

This invention relates to certain improvements in spools for barbed wire, or any other material to be spooled, which improvements are fully set forth and explained in the following specification and claims.

Referring to the drawings, B B represent a pair of heads of disk form, and each having cleats D D secured to one side, crosswise to the grain of the wood of the heads, for strengthening purposes. Each head is perforated centrally, as shown at D', and also by a concentric row of smaller holes, a, surrounding the perforation D'. The two heads B B are connected centrally, as shown in Figs. 1 and 5, by means of the wire W, threaded back and forth through the perforations a, to form a central cylinder upon which to wind the barbed wire. A band wire, c, may be applied to the periphery of each head in a proper groove, to prevent its splitting, if desired, as shown in Figs. 2 and 4. This form of head to the spool renders the wire wound thereon secure from falling beyond the plane of the outer face of the head, and also renders the spools when filled capable of being piled end on end for shipment or storing without injury to the wire wound on them, and makes a spool that can be readily rolled on the floor or ground to pay out the wire wound on them, and also makes a convenient head to be baled up for shipment, as shown in Fig. 3, before they are connected by means of the wire W.

I am aware that disk-shaped heads for spools are not in themselves new, and that spools adapted to roll on the ground to pay out the material wound on them are not new; and I am aware that a spool formed of a pair of bars for heads, tied together by means of wire serving to form the cylinder of the spool, has heretofore been used; but I am not aware that two disk-shaped heads connected by means of a wire or wires threaded through a row of perforations concentric with and surrounding a central perforation and forming the central cylinder on which to wind barbed wire has ever before been used.

Having thus described my invention, what I claim as new, and desire to secure by Letters Patent, is as follows, to wit:

1. A spool for barbed wire, consisting of the circular heads B, having the cleats D and holes D' and a, and having the peripheral band-wires c, in combination with the central tie-wire, W, substantially as set forth.

2. A spool for barbed wire, consisting of two circular heads centrally connected by a tie wire or wires, and having the peripheral band-wires c, substantially as set forth.

3. A spool for barbed wire, formed of two circular heads, each having central apertures, and each having perforations between said central apertures and their peripheries, in combination with a tie-wire threaded through said perforations, as and for the purpose set forth.

CALEB S. DE WITT.

Witnesses:
THOS. H. HUTCHINS,
WM. J. HUTCHINS.